(12) United States Patent
Oura (10) Patent No.: US 10,916,775 B2
(45) Date of Patent: Feb. 9, 2021

(54) SLURRY OF SULFIDE SOLID ELECTROLYTE, PVDF, AND KETONE SOLVENT, METHOD FOR PRODUCING ALL-SOLID-STATE BATTERY INCLUDING THE SLURRY, AND ALL-SOLID-STATE BATTERY PRODUCED BY THE METHOD

(71) Applicant: TOYOTA JIDOSHA KABUSHIKI KAISHA, Toyota (JP)

(72) Inventor: Kei Oura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/179,359

(22) Filed: Nov. 2, 2018

(65) Prior Publication Data
US 2019/0148733 A1 May 16, 2019

(30) Foreign Application Priority Data
Nov. 15, 2017 (JP) .................. 2017-219994

(51) Int. Cl.
*H01M 4/62* (2006.01)
*H01M 4/58* (2010.01)
(Continued)

(52) U.S. Cl.
CPC ......... *H01M 4/623* (2013.01); *H01M 4/0404* (2013.01); *H01M 4/139* (2013.01);
(Continued)

(58) Field of Classification Search
CPC .... H01M 4/623; H01M 4/0404; H01M 4/139; H01M 4/364; H01M 4/5815;
(Continued)

(56) References Cited

U.S. PATENT DOCUMENTS

2014/0004257 A1 1/2014 Kubo et al.
2016/0226094 A1* 8/2016 Yamazaki ........... H01M 4/0452
(Continued)

FOREIGN PATENT DOCUMENTS

JP 2012-212652 A 11/2012
WO WO-2014051032 A1 * 4/2014 ........ H01M 10/0565

*Primary Examiner* — Sean P Cullen
(74) *Attorney, Agent, or Firm* — Oliff PLC (57) ABSTRACT

A main object of the present disclosure is to provide a method for producing an all-solid-state battery in which the used amount of the PVDF binder may be decreased, and the deterioration of the sulfide solid electrolyte may be suppressed. The present disclosure achieves the object by providing a method for producing an all-solid-state battery, the method comprising a step of forming an electrolyte-containing layer by using a slurry including a sulfide solid electrolyte containing a Li element, a P element, and a S element, a PVDF binder, and a solvent, and as a first solvent, the solvent includes 50 volume % or more of a ketone solvent represented by a general formula (1):

General formula (1)

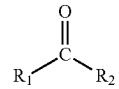

wherein, in the general formula (1), $R_1$ and $R_2$ are each independently a saturated hydrocarbon group or an aromatic hydrocarbon group, and a carbon number of at least one of $R_1$ and $R_2$ is 2 or more.

11 Claims, 1 Drawing Sheet

(51) Int. Cl.
*H01M 4/60* (2006.01)
*H01M 4/139* (2010.01)
*H01M 4/36* (2006.01)
*H01M 10/0585* (2010.01)
*H01M 10/0562* (2010.01)
*H01M 10/052* (2010.01)
*H01M 4/04* (2006.01)
*H01M 10/0525* (2010.01)
*H01M 4/02* (2006.01)

(52) U.S. Cl.
CPC ......... *H01M 4/364* (2013.01); *H01M 4/5815* (2013.01); *H01M 4/606* (2013.01); *H01M 4/62* (2013.01); *H01M 10/052* (2013.01); *H01M 10/0562* (2013.01); *H01M 10/0585* (2013.01); *H01M 10/0525* (2013.01); *H01M 2004/027* (2013.01); *H01M 2004/028* (2013.01)

(58) Field of Classification Search
CPC .... H01M 4/606; H01M 4/62; H01M 10/0652; H01M 10/0562; H01M 10/0585
USPC .......................................... 429/322, 326, 341
See application file for complete search history.

(56) References Cited

U.S. PATENT DOCUMENTS

2017/0214081 A1* 7/2017 Tsuno ............... H01M 10/0568
2017/0352917 A1* 12/2017 Makino ............... H01M 10/056

* cited by examiner

SLURRY OF SULFIDE SOLID ELECTROLYTE, PVDF, AND KETONE SOLVENT, METHOD FOR PRODUCING ALL-SOLID-STATE BATTERY INCLUDING THE SLURRY, AND ALL-SOLID-STATE BATTERY PRODUCED BY THE METHOD

TECHNICAL FIELD

The present disclosure relates to a method for producing an all-solid-state battery, an all-solid-state battery and slurry.

BACKGROUND ART

An all-solid-state battery is a battery including a solid electrolyte layer between a cathode active material layer and an anode active material layer, and one of the advantages thereof is that the simplification of a safety device may be more easily achieved compared to a liquid-based battery including a liquid electrolyte containing a flammable organic solvent.

A method of using slurry is known as a method for forming a cathode active material layer, an anode active material layer and a solid electrolyte layer. For example, Patent Literature 1 discloses a method for forming an active material layer or a solid electrolyte layer by using slurry including a sulfide solid electrolyte and a highly polar dispersion medium such as tertiary amine. Further, Patent Literature 1 discloses that the slurry includes a non-polar solvent, and a fluoride-containing binder such as PVDF is disclosed as a binder.

CITATION LIST

Patent Literature

Patent Literature 1: Japanese Patent Application Laid-Open (JP-A) No. 2012-212652

SUMMARY OF DISCLOSURE

Technical Problem

The solubility to a non-polar solvent (such as heptane) of the PVDF binder is extremely low. Therefore, when a non-polar solvent is used to the PVDF binder, the PVDF binder will be in a dispersed state (agglomerated stat) so that the binding force per used amount will be low. Therefore, in order to obtain a sufficient binding force, it is necessary to increase the used amount. Meanwhile, when a polar solvent (such as N-methyl-2-pyrrolidone) is used to the PVDF binder, the sulfide solid electrolyte is significantly deteriorated.

The present disclosure has been made in view of the above circumstances, and a main object of the present disclosure is to provide a method for producing an all-solid-state battery in which the used amount of the PVDF binder may be decreased, and the deterioration of the sulfide solid electrolyte may be suppressed.

Solution to Problem

In order to achieve the object, provided is a method for producing an all-solid-state battery, the method comprising a step of forming an electrolyte-containing layer by using a slurry including a sulfide solid electrolyte containing a Li element, a P element, and a S element, a PVDF binder, and a solvent, and as a first solvent, the solvent includes 50 volume % or more of a ketone solvent represented by a general formula (1) wherein, in the general formula (1), $R_1$ and $R_2$ are each independently a saturated hydrocarbon group or an aromatic hydrocarbon group, and a carbon number of at least one of $R_1$ and $R_2$ is 2 or more.

General formula (1)

According to the present disclosure, by using the slurry including the above described ketone solvent, an all-solid-state battery in which the used amount of the PVDF binder is low and the deterioration of the sulfide solid electrolyte is suppressed, may be obtained.

In the disclosure, the slurry may further include a cathode active material, and the electrolyte-containing layer may be a cathode active material layer.

In the disclosure, the slurry may further include an anode active material, and the electrolyte-containing layer may be an anode active material layer.

In the disclosure, the electrolyte-containing layer may be a solid electrolyte layer.

In the disclosure, a carbon number of the $R_1$ and the $R_2$ may be each independently 10 or less.

In the disclosure, as a second solvent, the solvent may include at least one of a saturated hydrocarbon solvent and an aromatic hydrocarbon solvent.

In the disclosure, the solvent may include 10 volume % or more of the second solvent.

Also, in the present disclosure, provided is an all-solid-state battery comprising a cathode active material layer, an anode active material layer, and a solid electrolyte layer formed between the cathode active material layer and the anode active material layer, and at least one of the cathode active material layer, the anode active material layer, and the solid electrolyte layer includes a sulfide solid electrolyte containing a Li element, a P element, and a S element, a PVDF binder, and a residual solvent, and the residual solvent includes a ketone solvent represented by the above described general formula (1), wherein, in the general formula (1), $R_1$ and $R_2$ are each independently a saturated hydrocarbon group or an aromatic hydrocarbon group, and a carbon number of at least one of $R_1$ and $R_2$ is 2 or more.

According to the present disclosure, since at least one of the cathode active material layer, the anode active material layer, and the solid electrolyte layer includes the residual solvent containing the above described ketone solvent, in other words, since at least one of the cathode active material layer, the anode active material layer, and the solid electrolyte layer is produced by using the above described ketone solvent, an all-solid-state battery in which the PVDF binder content is low and having a layer in which the deterioration of the sulfide solid electrolyte is suppressed, may be obtained.

Also, in the present disclosure, provided is a slurry comprising a sulfide solid electrolyte containing a Li element, a P element, and a S element, a PVDF binder, and a solvent, and as a first solvent, the solvent includes 50 volume % or more of a ketone solvent represented by the above described general formula (1), wherein, in the general formula (1), $R_1$ and $R_2$ are each independently a saturated hydrocarbon group or an aromatic hydrocarbon group, and a carbon number of at least one of $R_1$ and $R_2$ is 2 or more.

According to the present disclosure, since the above described ketone solvent is included, slurry in which the PVDF binder content is low and is capable of forming a layer in which the deterioration of the sulfide solid electrolyte is suppressed, may be obtained.

Advantageous Effects of Disclosure

The present disclosure exhibits an effect such as to provide a method for producing an all-solid-state battery in which the used amount of the PVDF binder may be decreased, and the deterioration of the sulfide solid electrolyte may be suppressed.

DESCRIPTION OF EMBODIMENTS

The present disclosure is hereinafter described in detail.

A. Method for Producing all-Solid-State Battery

The method for producing an all-solid-state battery of the present disclosure comprises a step of forming an electrolyte-containing layer by using a slurry including a sulfide solid electrolyte containing a Li element, a P element, and a S element, a PVDF binder, and a solvent. The electrolyte-containing layer may be a cathode active material layer, may be an anode active material layer, and may be a solid electrolyte layer.

Figure 1A:
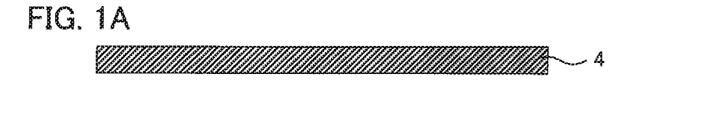
FIGS. 1A to 1C are schematic cross-sectional views illustrating an example of a cathode active material layer forming step in the present disclosure.
Figure 1B:
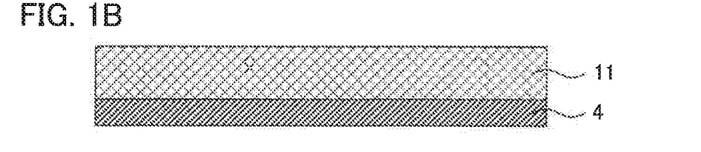
Figure 1C:
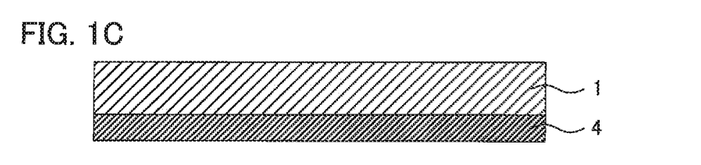

FIGS. 1A to 1C are schematic cross-sectional views illustrating an example of a cathode active material layer forming step in the present disclosure. In FIGS. 1A to 1C, at first, cathode current collector 4 is prepared (FIG. 1A). Next, coated layer 11 is formed by coating cathode current collector 4 with the slurry including a cathode active material, a sulfide solid electrolyte, a PVDF binder, and a solvent (FIG. 1B). Then, cathode active material layer 1 is formed by drying coated layer 11 (FIG. 1C). A major feature of the present disclosure is that the above described ketone solvent is used as a solvent of the slurry.

Figure 2:
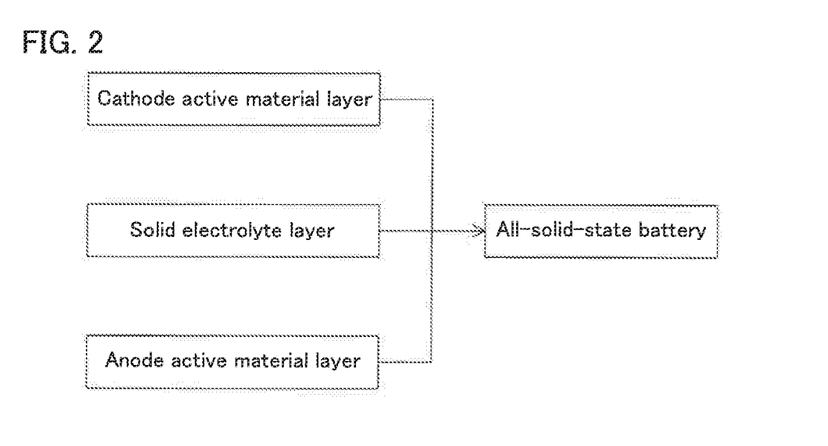
FIG. 2 is a flowchart illustrating an example of a method for producing an all-solid-state battery of the present disclosure.

FIG. 2 is a flowchart illustrating an example of a method for producing an all-solid-state battery of the present disclosure. The method for producing an all-solid-state battery illustrated in FIG. 2 comprises a cathode active material layer forming step of forming a cathode active material layer, an anode active material layer forming step of forming an anode active material layer, and a solid electrolyte layer forming step of forming a solid electrolyte layer. The cathode active material layer forming step has been described in the above described FIGS. 1A to 1C. However, in the present disclosure, it is preferable that the slurry including the above described ketone solvent is used in at least one step of the cathode active material layer forming step, the anode active material layer forming step, and the solid electrolyte layer forming step. Also, an all-solid-state battery may be obtained by stacking the cathode active material layer, the solid electrolyte layer, and the anode active material layer in this order.

According to the present disclosure, by using the slurry including the above described ketone solvent, an all-solid-state battery in which the used amount of the PVDF binder is low and the deterioration of the sulfide solid electrolyte is suppressed, may be obtained.

Since the polymer itself exhibits the polarity in the PVDF binder, the solubility to a non-polar solvent (such as heptane) is extremely low. Therefore, when a non-polar solvent is used to the PVDF binder, the PVDF binder will be in a dispersed state (agglomerated stat). Although a function as the binder may be exhibited by, for example, dispersing the PVDF binder into the non-polar solvent mechanically, the intrinsic performance of the PVDF binder cannot be sufficiently exhibited so that the binding force per used binder amount will be low. As the result, in order to obtain a sufficient binding force, it is necessary to increase the used binder amount.

Meanwhile, although the PVDF binder may be dissolved, when a polar solvent (such as N-methyl-2-pyrrolidone) is used to the PVDF binder, the decomposition of the sulfide solid electrolyte is caused so that the sulfide solid electrolyte is significantly deteriorated. As described above, for the conventional slurry, it is difficult to achieve the both of the decrease of the used PVDF binder amount and the suppression of the deterioration of the sulfide solid electrolyte.

In contrast, since the above described ketone solvent may dissolve the PVDF binder, the binder may be dispersed evenly in the layer. Therefore, binding points are increased so that the intrinsic performance of the PVDF binder may be sufficiently exhibited. As the result, a sufficient binding force may be obtained even when the used binder amount is low. Meanwhile, since the above described ketone solvent is relatively low in polarity, the deterioration of the sulfide solid electrolyte may be suppressed. In the present disclosure, as described above, by using the slurry including the above described ketone solvent, the both of the decrease of the used PVDF binder amount and the suppression of the deterioration of the sulfide solid electrolyte may be achieved.

Further, compared to a butadiene binder and an acrylic binder, for example, the PVDF binder is superior in the voltage resistance. Therefore, there are advantages that, even when the PVDF binder is used in a high-voltage all-solid-state battery, the electrochemical decomposition is not likely to occur so that a high cycle property may be obtained.

The method for producing an all-solid-state battery of the present disclosure is hereinafter described in detail.

1. Cathode Active Material Layer Forming Step

The method for producing an all-solid-state battery of the present disclosure preferably comprise a cathode active material layer forming step of forming a cathode active material layer using the slurry described later.

(1) Slurry

The slurry forming the cathode active material layer preferably include at least a cathode active material, a sulfide solid electrolyte, a PVDF binder and a solvent. The slurry may further include a conductive material as necessary.

(i) Solvent

The solvent in the present disclosure is a solvent to which the PVDF binder is highly soluble. As a first solvent, this solvent includes 50 volume % or more of a ketone solvent represented by a general formula (1).

General formula (1)

In the general formula (1), $R_1$ and $R_2$ are each independently a saturated hydrocarbon group or an aromatic hydrocarbon group. Also, a carbon number of at least one of $R_1$ and $R_2$ is 2 or more. That is, an acetone in which the carbon number of each $R_1$ and $R_2$ is 1, is not included in the general formula (1). Since the acetone is low in the molecular weight, the ability to dissolve a solute is too high so that the deterioration of the sulfide solid electrolyte is easily caused. That is, by the carbon number of at least one of $R_1$ and $R_2$ being 2 or more, the deterioration of the sulfide solid electrolyte may be suppressed. Incidentally, $R_1$ and $R_2$ usually do not form a ring structure, and are independent from each other.

The carbon number of $R_1$ is 1 or more, may be 2 or more, may be 3 or more, and may be 4 or more. Meanwhile, the carbon number of $R_1$ is, for example, 15 or less, may be 10 or less, and may be 8 or less. Similarly, the carbon number of $R_2$ is 1 or more, may be 2 or more, may be 3 or more, and may be 4 or more. Meanwhile, the carbon number of $R_2$ is, for example, 15 or less, may be 10 or less, and may be 8 or less. Also, the total carbon number of $R_1$ and $R_2$ is 3 or more, and may be 5 or more. Meanwhile the total carbon number of $R_1$ and $R_2$ is, for example, 15 or less, may be 10 or less, and may be 8 or less.

Examples of the ketone solvent may include methyl ethyl ketone, diethyl ketone, methyl propyl ketone, methyl isobutyl ketone, diisobutyl ketone, methyl amyl ketone, acetophenone, and benzophenone. The first solvent may be 1 kind, or may be 2 kinds or more of the ketone solvent represented by the general formula (1).

The proportion of the first solvent in the solvent as a whole is usually 50 volume % or more, may be 70 volume % or more, and may be 90 volume % or more. Meanwhile, the proportion of the first solvent in the solvent as a whole is usually 100 volume % or less.

The solvent in the present disclosure may be the first solvent only, and may include other solvent. Above all, as a second solvent, the solvent preferably include at least one of a saturated hydrocarbon solvent and an aromatic hydrocarbon solvent. The reason therefor is to further suppress the deterioration of the sulfide solid electrolyte.

The saturated hydrocarbon solvent is preferably an alkane, for example. The alkane may be a chain alkane, and may be a cyclic alkane. The carbon number of the saturated hydrocarbon solvent is, for example, 5 or more, may be 7 or more, and may be 9 or more. Meanwhile, the carbon number of the saturated hydrocarbon solvent is, for example, 15 or less, and may be 10 or less. Examples of the saturated hydrocarbon solvent may include isopentane, isohexane, n-hexane, cyclohexane, methylcyclohexane, ethylcyclohexane, n-heptane, isooctane, and n-decane.

The carbon number of the aromatic hydrocarbon solvent is, for example, 7 or more, and may be 9 or more. Meanwhile, the carbon number of the aromatic hydrocarbon solvent is, for example, 20 or less, and may be 15 or less. Examples of the aromatic hydrocarbon solvent may include toluene and xylene.

The proportion of the second solvent in the solvent as a whole is, for example, 5 volume % or more, and may be 10 volume % or more. Also, the proportion of the second solvent in the solvent as a whole is usually 50 volume % or less. Also, the solvent in the present disclosure is preferably low in water content. The reason therefor is to suppress the deterioration of the sulfide solid electrolyte. The water content in the solvent as a whole is, for example, 100 ppm or less, and is preferably 50 ppm or less.

(ii) PVDF Binder

The PVDF binder is a polymer including the following monomer unit.

The PVDF binder may be a homopolymer, and may be a copolymer. Also, the PVDF binder preferably include the above described monomer unit as the main component. Examples of the PVDF binder may include polyvinylidene fluoride (PVDF), and polyvinylidene fluoride-hexafluoropropylene copolymer (PVDF-HFP).

The proportion of the PVDF binder to the total solid content of the slurry is, for example, 10% by weight or less, may be 5% by weight or less, may be 3% by weight or less and may be 2% by weight or less. When the proportion of the PVDF binder is too much, the proportions of the cathode active material and the sulfide solid electrolyte are decreased relatively so that sufficient battery performance may not be obtained. Meanwhile, the proportion of the PVDF binder to the total solid content of the slurry is, for example, 0.5% by weight or more.

(iii) Sulfide Solid Electrolyte

The sulfide solid electrolyte is a material having ion conductivity. The sulfide solid electrolyte preferably contains a Li element, a P element, and a S element. Further, the sulfide solid electrolyte may include at least one kind of a Ge element, a Si element, and a Sn element. Also, as a halogen element, the sulfide solid electrolyte may include at least one of a Cl element, a Br element, and an I element. Also, the sulfide solid electrolyte may include an O element.

The sulfide solid electrolyte preferably includes an ion conductor containing a Li element, a P element, and a S element. Further, the ion conductor preferably includes $PS_4^{3-}$ as a main anion structure. The phrase "includes $PS_4^{3-}$ as a main anion structure" means that the proportion of $PS_4^{3-}$ is the highest among the all anion structures in the ion conductor. The proportion of $PS_4^{3-}$ in the all anion structures is, for example, 60 mol % or more, may be 70 mol % or more, may be 80 mol % or more, and may be 90 mol % or more. The proportion of $PS_4^{3-}$ may be determined by, for example, a Raman spectroscopy, a NMR, and an XPS. Also, a part of the S element of the ion conductor may be substituted by an O element.

The sulfide solid electrolyte preferably includes LiX (X is at least one kind of Cl, Br and I) in addition to the above described ion conductor. Also, it is preferable that at least a part of LiX exists in a state being incorporated into the structure of the ion conductor, as LiX. The proportion of LiX in the sulfide solid electrolyte is, for example, 1 mol % or more, and may be 10 mol % or more. Meanwhile, the proportion of LiX is, for example, 50 mol % or less, and may be 35 mol % or less.

The sulfide solid electrolyte may be amorphous, or may be a crystal. An example of the former may be sulfide glass, and an example of the latter may be a crystalline sulfide glass (glass ceramic).

The sulfide solid electrolyte preferably includes a crystal phase having a peak at 2θ=20.2°±0.5°, 23.6°±0.5° in X-ray diffraction measurement using a CuKα ray. This crystal phase is a crystal phase with high Li ion conductivity. Incidentally, this crystal phase is referred to as crystal phase A in some cases. In addition to 2θ=20.2°, 23.6°, crystal phase A usually has a peak at 2θ=29.4°, 37.8°, 41.1°, 47.0°. These peak positions may also be variable in a range of ±0.5°.

The half width of peak of 2θ=20.2°, that is a peak of crystal phase A, is preferably small. This half width is, for example, 0.51° or less, preferably 0.50° or less, and more preferably 0.45° or less. Incidentally, the half width refers to the full-width at half-maximum (FWHM) of the peak of 2θ=20.2°.

The sulfide solid electrolyte preferably includes no crystal phase having a peak at 2θ=21.0°=0.5°, 28.0°±0.5° in X-ray diffraction measurement using a CuKα ray. This crystal phase is a crystal phase with lower Li ion conductivity than crystal phase A. Incidentally, this crystal phase is referred to as crystal phase B in some cases. In addition to 2θ=21.0°, 28.0°, crystal phase B usually has a peak at 2θ=32.0°, 33.4°, 38.7°, 42.8°, 44.2°. These peak positions may also be variable in a range of ±0.5°.

The value ($I_{21.0}/I_{20.2}$) of the peak intensity in the vicinity of 2θ=21.0° of crystal phase B ($I_{21.0}$) to the peak intensity in the vicinity of 2θ=20.2° of crystal phase A ($I_{20.2}$) is, for example, 0.4 or less, preferably 0.2 or less, and more preferably 0.1 or less. Incidentally, $I_{21.0}/I_{20.2}$ may be 0.

The sulfide solid electrolyte preferably includes a crystal phase having a peak at 2θ=20.18°±0.50°, 20.44°±0.50°, 26.96°±0.50°, 29.58°±0.50°. This crystal phase is a crystal phase with high Li ion conductivity, and is known as so-called LGPS type crystal phase. This crystal phase is referred to as crystal phase C in some oases. In addition to the above, crystal phase C usually has a peak at 2θ±17.38°, 23.56°, 23.96°, 24.93°, 29.07°, 31.71°, 32.66°, 33.39°. These peak positions may also be variable in a range of ±0.50°.

The sulfide solid electrolyte preferably includes no crystal phase having a peak at 2θ=27.33°±0.50°. This crystal phase is a crystal phase with lower Li ion conductivity than LGPS type crystal phase. Incidentally this crystal phase is referred to as crystal phase D in some cases. Also, in addition to 2θ=27.33°, crystal phase D usually has a peak at 2θ=17.46°, 18.12°, 19.99°, 22.73°, 25.72°, 27.33°, 29.16°, 29.78°. These peak positions may also be variable in a range of ±0.50°.

When the peak intensity in the vicinity of 2θ=29.58° of crystal phase C is regarded as $I_C$, and the peak intensity in the vicinity of 2θ=27.33° of crystal phase D is regarded as $I_D$, the value of $I_D/I_C$ is, for example, less than 0.50, preferably 0.45 or less, and more preferably 0.15 or less. Particularly, the value of $I_D/I_C$ is preferably 0.

The sulfide solid electrolyte preferably has high Li ion conductivity. The Li ion conductivity of the sulfide solid electrolyte at 25° C. is preferably $1\times10^{-4}$ S/cm or more, for example, and more preferably $1\times10^{-3}$ S/cm or more. Also, example of the shape of the sulfide solid electrolyte may include a granular shape. The average particle size ($D_{50}$) of the sulfide solid electrolyte is, for example, 0.1 μm or more, and may be 0.5 μm or more. Meanwhile, the average particle size ($D_{50}$) is 50 μm or less, for example, and may be 5 μm or less. Incidentally, the average particle size may be calculated from the measurement by, for example, a laser diffraction type particle size distribution analyzer and a scanning electron microscope (SEM).

(iv) Cathode Active Material

The cathode active material is not particularly limited, and typical examples thereof may include an oxide active material. Examples of the oxide active material may include a rock salt bed type active material such as $LiCoO_2$, $LiMnO_3$, $LiNiO_3$, $LiVO_2$, and $LiNi_{1/3}Co_{1/3}Mn_{1/3}O_2$; a spinal type active material such as $LiMn_2O_4$ and $Li(Ni_{0.5}M_{1.5})O_4$; and an olivine type active material such as $LiFePO_4$, $LiMnPO_4$, $LiNiPO_4$, and $LiCuPO_4$.

Also, a surface of the cathode active material may be covered with a coating layer. The reason therefore is to suppress the reaction between the cathode active material and the sulfide solid electrolyte by the coating layer. Examples of the coating layer may include Li ion conductive oxides such as $LiNbO_3$, $Li_3PO_4$ and LiPON. The average thickness of the coating layer is, for example, 1 nm or more. Meanwhile, the average thickness of the coating layer is, for example, 20 nm or less, and may be 10 nm or less.

Example of the shape of the cathode active material may include a granular shape. The average particle size ($D_{50}$) of the cathode active material is, for example, 0.1 μm or more and 50 μm or less. Incidentally, the average particle size may be calculated from the measurement by, for example, a laser diffraction type particle size distribution analyzer and a scanning electron microscope (SEM).

(v) Additives

The slurry may further include a conductive material as necessary. Examples of the conductive material may include acetylene black, Ketjen black, and carbon fiber. Also, the slurry may include additives such as thickener and dispersant as necessary.

(vi) Method for Preparing Slurry

Examples of a method for preparing slurry may include a method of mixing and kneading a sulfide solid electrolyte, a PVDF binder and a solvent. Examples of the mixing and kneading method may include an ultrasonic homogenizer, a shaker, a thin-film spin system mixer, a dissolver, a homo mixer, a kneader, a roll mill, a sand mill, an attritor, a ball mill, a vibrator mill and a high speed impeller mill.

(2) Method for Forming Cathode Active Material Layer

Examples of a method for forming a cathode active material layer may include a method including a coated layer forming step of forming a coated layer by coating a substrate with slurry, and a drying step of forming a cathode active material layer by drying the coated layer. Examples of a method for coating the slurry may include a doctor blade method, a die coating method, a gravure coating method, a spray coating method, an electrostatic coating method and a bar coating method.

Meanwhile, a substrate coated with the slurry is not particularly limited, and examples thereof may include a cathode current collector. By coating a cathode current collector with the slurry, a cathode in which the cathode current collector and the cathode active material layer are well adhered to each other, may be obtained. Examples of the cathode current collector material may include US, aluminum, nickel, iron, titanium and carbon.

Also, the method for drying the coated layer is not particularly limited, and examples thereof may include general methods such as warm-air/hot-blast drying, infrared ray drying, reduced-pressure drying, and dielectric heat drying. Also, examples of the drying atmosphere may include inert gas atmospheres such as an Ar gas atmosphere and a nitrogen gas atmosphere, an air atmosphere and a vacuum. The drying temperature is not particularly limited, and is preferably a temperature at which the material included in the coated layer is not deteriorated.

After drying the coated layer, at least one of a heat treatment and a press treatment may be carried out as necessary. Examples of the heat treatment may include a heat treatment for crystallizing the sulfide solid electrolyte. Examples of the press treatment may include a press treatment for densifying the cathode active material layer.

The thickness of the cathode active material layer to be obtained is, for example, 0.1 μm or more. Meanwhile, the thickness of the cathode active material layer to be obtained is, for example, 1000 μm or less, and may be 300 μm or less.

2. Anode Active Material Layer Forming Step

The method for producing an all-solid-state battery of the present disclosure preferably comprise an anode active material layer forming step of forming an anode active material layer using the slurry described later.

(1) Slurry

The slurry forming the anode active material layer preferably includes an anode active material, a sulfide solid electrolyte, a PVDF binder and a solvent. The slurry may further include a conductive material as necessary.

The anode active material is not particularly limited, and examples thereof may include a carbon active material, a metal active material, and an oxide active material. Examples of the carbon active material may include graphite, hard carbon, and soft carbon. Meanwhile, examples of the metal active material may include a simple substance such as Li, In, Al, Si and Sn, and an alloy including at least one kind of these elements. Also, examples of the oxide active material may include $Li_4TiO_5$.

Incidentally, the generals of the sulfide solid electrolyte, the PVDF binder, the solvent, the conductive material, and the slurry are basically the same as those described in "1. Cathode active material layer forming step, (1) Slurry" above; thus, the descriptions herein are omitted.

(2) Method for Forming Anode Active Material Layer

Examples of a method for forming an anode active material layer may include a method including a coated layer forming step of forming a coated layer by coating a substrate with the slurry, and a drying step of forming an anode active material layer by drying the coated layer. The method is basically the same as those described in "1. Cathode active material layer forming step, (2) Method for forming cathode active material layer" above, except that an anode active material is used instead of the cathode active material; thus, the descriptions herein are omitted. Incidentally, when the substrate coated with the slurry is an anode current collector, examples of the material of the anode current collector may include SUS, copper, nickel, and carbon.

The thickness of the anode active material layer to be obtained is, for example, 0.1 μm or more. Meanwhile the thickness of the anode active material layer to be obtained is, for example, 1000 μm or less, and may be 300 μm or less.

3. Solid Electrolyte Layer Forming Step

The method for producing an all-solid-state battery of the present disclosure preferably includes a solid electrolyte layer forming step of forming a solid electrolyte layer by using the slurry described later.

(1) Slurry

The slurry forming the solid electrolyte layer preferably includes a sulfide solid electrolyte, a PVDF binder, and a solvent. Incidentally, since an insulating property is necessary for the solid electrolyte layer, this slurry does not usually include a conductive material.

The generals of the sulfide solid electrolyte, the PVDF binder, the solvent, and the slurry are basically the same as those described in "1. Cathode active material layer forming step, (1) Slurry" above; thus, the descriptions herein are omitted. Also, the proportion of the PVDF binder to total solid content of the slurry is, for example, 6% by weight or less, may be 3% by weight or less, and may be 1% by weight or less. Meanwhile, the proportion of the PVDF binder to the total solid content of the slurry is, for example, 0.1% by weight or more.

(2) Method for Forming Solid Electrolyte Layer

Examples of a method for forming a solid electrolyte layer may include a method including a coated layer forming step of forming a coated layer by coating a substrate with the slurry, and a drying step of forming a solid electrolyte layer by drying the coated layer. The method is basically the same as those described in "1. Cathode active material layer forming step, (2) Method for forming cathode active material layer" above, except that a cathode active material is not used; thus, the descriptions herein are omitted. Incidentally, the substrate coated with the slurry is preferably a substrate for transfer. After forming a solid electrolyte layer on a substrate for transfer, and contacting the obtained solid electrolyte layer with a cathode active material layer or an anode active material layer, the substrate for transfer is peeled off.

The thickness of the solid electrolyte layer to be obtained is, for example, 0.1 μm or more. Meanwhile the thickness of the solid electrolyte layer to be obtained is, for example, 1000 μm or less, and may be 300 μm or less.

4. Stacking Step

The method for producing an all-solid-state battery of the present disclosure usually includes a stacking step of stacking a cathode active material layer, a solid electrolyte layer and an anode active material layer in this order, thereby forming a power generating element. A method for stacking is not particularly limited and an arbitrary method may be employed. Also, a press treatment may be carried out in the thickness direction as necessary. Also, the obtained power generating element may be housed in a battery case. The characteristics of the obtained all-solid-state battery will be described in "B. All-solid-state battery" later.

B. All-Solid-State Battery

Figure 3:
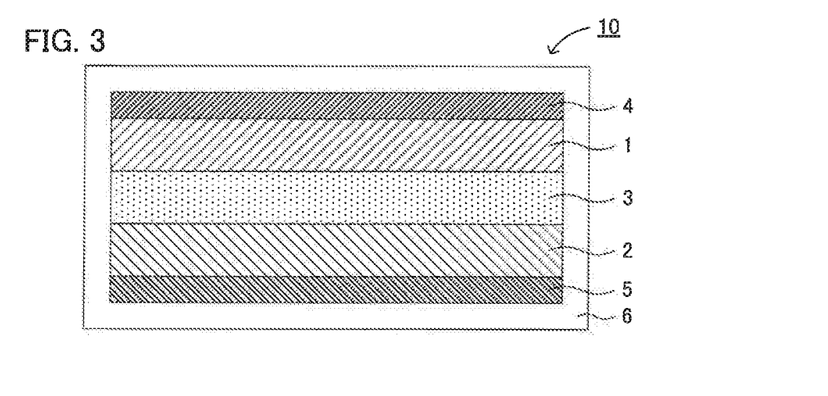
FIG. 3 is a schematic cross-sectional view illustrating an example of an all-solid-state battery of the present disclosure.

FIG. 3 is a schematic cross-sectional view illustrating an example of an all-solid-state battery of the present disclosure. All-solid-state battery 10 shown in FIG. 3 comprises cathode active material layer 1, anode active material layer 2, solid electrolyte layer 3 formed between cathode active material layer 1 and anode active material layer 2, cathode current collector 4 that collects current of cathode active material layer 1, anode current collector 5 that collects current of anode active material layer 2, and battery case 6 that houses these members. At least one of cathode active material layer 1, anode active material layer 2, and solid electrolyte layer 3 includes a sulfide solid electrolyte containing a Li element, a P element, and a S element, a PVDF binder, and a residual solvent including a ketone solvent represented by the above described general formula (1).

According to the present disclosure, since at least one of the cathode active material layer, the anode active material layer, and the solid electrolyte layer includes the residual solvent including the above described ketone solvent, in other words, since at least one of the cathode active material layer, the anode active material layer, and the solid electrolyte layer is produced by using the above described ketone solvent, an all-solid-state battery in which the PVDF binder content is low and having a layer in which the deterioration of the sulfide solid electrolyte is suppressed, may be obtained.

The residual solvent in the present disclosure is a solvent that remains unavoidably when at least one layer of the cathode active material layer, the anode active material layer, and the solid electrolyte layer is formed by using the slurry including the above described ketone solvent. When the slurry includes the above described second solvent, the second solvent may be included in the residual solvent in some cases.

The presence of the residual solvent may be confirmed by, for example, heating a sample, and measuring the discharged gas with a gas chromatography. Meanwhile, from the viewpoint of the battery performance, the content of the residual solvent included in a layer is preferably low. The content of the residual solvent is preferably, for example, 200 ppm or less. The reason therefor is to suppress the side reaction by the residual solvent (such as deterioration of the battery performance due to a part of the active material or the sulfide solid electrolyte being covered with a decomposition product).

The all-solid-state battery of the present disclosure is usually a lithium ion battery. The all-solid-state battery may be a primary battery or may be a secondary battery. Among the above, the secondary battery is preferable, so as to be repeatedly charged and discharged, and is useful as, for example, a car-mounted battery. Examples of the shape of the all-solid-state battery may include a coin shape, a laminate shape, a cylindrical shape, and a square shape.

C. Slurry

The slurry of the present disclosure comprises a sulfide solid electrolyte containing a Li element, a P element, and a S element, a PVDF binder, and a solvent, and as a first solvent, the solvent includes 50 volume % or more of a ketone solvent represented by the above described general formula (1).

According to the present disclosure, since the above described ketone solvent is included, the slurry in which the PVDF binder content is low and is capable of forming a layer in which the deterioration of the sulfide solid electrolyte is suppressed, may be obtained.

The slurry of the present disclosure may include a cathode active material, or may include an anode active material. The details of the slurry are similar to those described in "A. Method for producing all-solid-state battery" above; thus, the descriptions herein are omitted. Also, the slurry of the present disclosure is preferably used for forming a cathode active material layer, an anode active material layer, or a solid electrolyte layer.

Incidentally, the present disclosure is not limited to the embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is described in more details. Incidentally, the experiments were carried out basically in an inert gas.

Example 1

<Production of Cathode Structure>

A cathode active material ($LiNi_{1/3}Mn_{1/3}Co_{1/3}O_2$, manufactured by Nichia Corporation) and a sulfide solid electrolyte ($LiI—Li_2O—Li_2B—P_2S_5$) were weighed and mixed so as to be cathode active material:sulfide solid electrolyte=75:25 in the weight ratio. Further, 3.0 parts by weight of a conductive material (a vapor-grown carbon fiber, manufactured by Showa Denko K. K.) was added to 100 parts by weight of the cathode active material. Then, a binder (PVDF-HFP, Solef 131508, manufactured by Solvay GmbH) was added so as to be 3.0% by weight to the total solid content. Thereby a cathode mixture was obtained.

Also, methyl isobutyl ketone (MIBK, dehydrated grade, manufactured by Nacalai Tesque, Inc.) was prepared as the first solvent, n-decane (manufactured by Tokyo Chemical Industry Co., Ltd.) dehydrate treated with molecular sieve was prepared as the second solvent, and the first solvent and the second solvent were weighed and mixed so as to be first solvent:second solvent=90:10 in the volume ratio. Thereby, a mixed solvent was obtained.

The mixed solvent was added to the cathode mixture, and the solid content concentration was adjusted to 63% by weight. Then, cathode slurry was obtained by mixing and kneading thereof for 1 minute with an ultrasonic homogenizer (UN-50, manufactured by SMT Co., Ltd.). A surface of a cathode current collector (an aluminum foil, manufactured by Showa Denko K. K.) was coated with the obtained cathode slurry using an applicator (with 350 μm gap, manufactured by Taiyukizai Corporation), dried naturally for 5 minutes, and dried by heating at 100° C. for 5 minutes. Thereby, a cathode structure including the cathode current collector and the cathode active material layer was obtained.

<Production of Anode Structure>

An anode active material (graphite, MF-6 manufactured by Mitsubishi Chemical Corporation) and a sulfide solid electrolyte ($LiI—Li_2O—Li_2S—P_2S_5$) were weighed and mixed so as to be anode active material:sulfide solid electrolyte=58:42 in the weight ratio. Then, a binder (PVDF-HFP, Solef 131508, manufactured by Solvay GmbH) was added so as to be 3.0% by weight to the total solid content. Thereby an anode mixture was obtained.

Also, methyl isobutyl ketone (MIBX, dehydrated grade, manufactured by Nacalai Tesque, Inc.) was prepared as the first solvent, n-decane (manufactured by Tokyo Chemical Industry Co., Ltd.) dehydrate treated with molecular sieve was prepared as the second solvent, and the first solvent and the second solvent were weighed and mixed so as to be first solvent:second solvent=90:10 in the volume ratio. Thereby, a mixed solvent was obtained.

The mixed solvent was added to the anode mixture, and the solid content concentration was adjusted to 63% by weight. Then, anode slurry was obtained by mixing and kneading thereof for 1 minute with an ultrasonic homogenizer (UH-50, manufactured by SMT Co., Ltd.). A surface of an anode current collector (a copper foil) was coated with the obtained anode slurry using an applicator (with 350 μm gap, manufactured by Taiyukizai Corporation), dried naturally for 5 minutes, and dried by heating at 100° C. for 5 minutes. Thereby, an anode structure including the anode current collector and the anode active material layer was obtained.

<Production of all-Solid-State Battery>

A sulfide solid electrolyte ($LiI—Li_2O—LiO_2—P_2S_5$) and a binder (PVDF-HPP, Solef 131508, manufactured by Solvay GmbH) were prepared. Then, the binder was added so as to be 2.0% by weight to the total solid content. Thereby a solid electrolyte mixture was obtained.

Also, methyl isobutyl ketone (MIBK, dehydrated grade, manufactured by Nacalai Tesque, Inc.) was prepared as the first solvent, n-decane (manufactured by Tokyo Chemical Industry Co., Ltd.) dehydrate treated with molecular sieve was prepared as the second solvent, and the first solvent and the second solvent were weighed and mixed so as to be first solvent:second solvent=90:10 in the volume ratio. Thereby, a mixed solvent was obtained.

The mixed solvent was added to the solid electrolyte mixture, and the solid content concentration was adjusted to 35% by weight. Then, solid electrolyte slurry was obtained by mixing and kneading thereof with an ultrasonic homogenizer (UH-50, manufactured by SMT Co., Ltd.). A surface of a substrate for transfer (an aluminum foil) was coated with the obtained solid electrolyte slurry using an applicator and dried. Then, a transfer body including the substrate for transfer and the solid electrolyte layer was obtained by punching the above into an area of 1 $cm^2$.

The cathode structure and the transfer body were placed so that the cathode active material layer and the solid electrolyte layer are in contact with each other, and the substrate for transfer was peeled off. Then, the anode structure was placed so that the anode active material layer is in contact with the exposed solid electrolyte layer. Then, an all-solid-state battery was obtained by pressing the above under pressure of 4.3 ton.

Example 2

An all-solid-state battery was obtained in the same manner as in Example 1 except that the binder used for the cathode slurry, the anode slurry and the solid electrolyte slurry was changed to PVDF (Solef 9007, manufactured by Solvay GmbH).

Example 3

An all-solid-state battery was obtained in the same manner as in Example 1 except that the proportions of the first solvent and the second solvent used for the cathode slurry, the anode slurry and the solid electrolyte slurry were changed to the proportion shown in Table 1.

Example 4

An all-solid-state battery was obtained in the same manner as in Example 1 except that the first solvent used for the cathode slurry, the anode slurry and the solid electrolyte slurry was changed to diisobutyl ketone (DIBK).

Example 5

An all-solid-state battery was obtained in the same manner as in Example 1 except that the first solvent used for the cathode slurry, the anode slurry and the solid electrolyte slurry was changed to acetophenone.

Comparative Example 1

An all-solid-state battery was obtained in the same manner as in Example 1 except that the solvent used for the cathode slurry, the anode slurry and the solid electrolyte slurry was changed to n-decane, and the binder included in the cathode active material layer, the anode active material layer and the solid electrolyte layer was changed to styrene-butadiene rubber (SBR).

Comparative Example 2

An all-solid-state battery was obtained in the same manner as in Example 1 except that the solvent used for the cathode slurry, the anode slurry and the solid electrolyte slurry was changed to butyl butyrate.

Comparative Example 3

An all-solid-state battery was obtained in the same manner as in Example 1 except that the solvent used for the cathode slurry, the anode slurry and the solid electrolyte slurry was changed to N-methyl-2-pyrrolidone (NMP).

[Peel Strength Evaluation]

By using the cathode structure produced in Examples 1 to 5 and Comparative Examples 1 to 3, the peel strength between the cathode current collector and the cathode active material layer was evaluated. Specifically, by using a tensile load measuring device (RX-5/MODEL-2257, manufactured by Aikoh Engineering Co., Ltd.), a vertical peeling test was carried out in a glove box, under argon atmosphere at room temperature. First, a sample was fixed onto a seat with double-faced tape so as the cathode slurry coated surface (cathode active material layer) faces upward. Another double-faced tape was stuck to the tip part of the attachment of the tensile load measuring device, and the adhesive surface of the double-faced tape was faced to the sample side. The double-faced tape and the cathode slurry coated surface (cathode active material layer) were brought into contact with each other by letting the tensile load measuring device down vertically toward the sample at a constant speed (about 20 mm/min.), and then, the tensile load measuring device was brought up. The tensile load when the coated layer (cathode active material layer) was peeled off was determined as the peel strength.

The peel strength was evaluated by the following evaluation standards. The results are shown in Table 1.

A: over 10 $N/cm^2$
B: 2 $N/cm^2$ or more and 10 $N/cm^2$ or less
C: less than 2 $N/cm^2$

[Li Ion Conductivity Evaluation]

By using the anode slurry produced in Examples 1 to 5 and Comparative Examples 1 to 3, the Li ion conductivity was evaluated. Specifically, powder was obtained by coating a stainless-steel foil or an aluminum foil with the anode slurry, and scraping off the dried film. Then, a sample was obtained by molding the powder into a cylindrical shape with 11.28 mm diameter and 0.5 mm height. The Li ion conductivity (25° C.) was measured for the obtained sample by the alternating-current impedance method. A frequency response analyzer (Solartron 1260, manufactured by Solartron ISA) was used for the measurement, and the measuring conditions were: applied voltage of 10 mV and measuring frequency range of 0.01 MHz to 1 MHz.

The Li ion conductivity was evaluated by the following evaluation standards. The results are shown in Table 1.

A: over $3.0 \times 10^{-3}$ S/cm
B: $1.0 \times 10^{-3}$ S/car or more and $3.0 \times 10^{-3}$ S/cm or less
C: less than $1.0 \times 10^{-3}$ S/cm

[Cycle Property Evaluation]

By using the all-solid-state battery obtained in Examples 1 to 5 and Comparative Examples 1 to 3, the cycle property was evaluated. Specifically, a cycle operation was repeated for 100 cycles a cycle includes CCCV charging until 4.2 V at 0.5 C and then, discharging until 3.0 V at 0.5 C. The proportion of the discharge capacity at $100^{th}$ cycle to the discharge capacity at $1^{st}$ cycle was determined as the capacity durability (%).

The cycle property (capacity durability) was evaluated by the following evaluation standards. The results are shown in Table 1.

A: over 98%
B: 80% or more and 98% or less
C: less than 80%

TABLE 1

|  | Example 1 | Example 2 | Example 3 | Example 4 | Example 5 |
|---|---|---|---|---|---|
| First solvent | MIBK | MIBK | MIBK | DIBK | Acetophenone |
| Proportion (vol. %) | 90 | 90 | 50 | 90 | 90 |
| Second solvent | n-Decane | n-Decane | n-Decane | n-Decane | n-Decane |
| Proportion (vol. %) | 10 | 10 | 50 | 10 | 10 |
| Binder | PVDF-HFP | PVDF | PVDF-HFP | PVDF-HFP | PVDF-HFP |
| Proportion in active material layer (wt %) | 3 | 3 | 3 | 3 | 3 |
| Proportion in solid electrolyte layer (wt %) | 2 | 2 | 2 | 2 | 2 |
| Peel strength | A | A | B | A | A |
| Resistance | A | A | A | A | A |
| Cycle property | A | A | B | A | A |

|  | Comp. Ex. 1 | Comp. Ex. 2 | Comp. Ex. 3 |
|---|---|---|---|
| First solvent | n-Decane | Butyl butyrate | NMP |
| Proportion (vol. %) | 100 | 100 | 100 |
| Second solvent | — | — | — |
| Proportion (vol. %) | — | — | — |
| Binder | SBR | PVDF-HFP | PVDF-HFP |
| Proportion in active material layer (wt %) | 3 | 3 | 3 |
| Proportion in solid electrolyte layer (wt %) | 2 | 2 | 2 |
| Peel strength | A | C | C |
| Resistance | B | A | C |
| Cycle property | C | C | C |

As shown in Table 1, the results of the peel strength, the resistance and the cycle property in Examples 1 to 5 were good. The peel strength here shows the degree of dissolution of the PVDF binder, and Examples 1 and 2 in which the first solvent proportion was high showed superior peel strength, compared to Example 3. Also, the resistance shows the degree of deterioration of the sulfide solid electrolyte, and the deterioration of the sulfide solid electrolyte was extremely low in every one of Examples 1 to 5.

Comparing Examples 1 to 5 with Comparative Example 1, the cycle property was good in Examples 1 to 5. Thereby, it was confirmed that the PVDF binder is superior to the butadiene binder in voltage resistance. Also, comparing Examples 1 to 5 with Comparative Example 2, the peel strength and the cycle property were poor in Comparative Example 2. It is presumed that this is because the PVDF binder was not dissolved into butyl butyrate so that the PVDF binder was not able to exhibit the intrinsic performance sufficiently. Also, comparing Examples 1 to 5 with Comparative Example 3, all of the peel strength, the resistance and the cycle property were poor in Comparative Example 3. It is presumed that this is because, although the PVDF binder was dissolved into NMP, the sulfide solid electrolyte was greatly deteriorated by NMP.

REFERENCE SIGNS LIST

1 . . . cathode active material layer
2 . . . anode active material layer
3 . . . solid electrolyte layer
4 . . . cathode current collector
5 . . . anode current collector
6 . . . battery case
10 . . . all-solid-state battery

What is claimed is:

1. A slurry comprising a sulfide solid electrolyte containing $LiI$—$Li_2O$—$Li_2S$—$P_2S_5$, a PVDF binder, and a solvent, and as a first solvent, the solvent includes 50 volume % or more of a ketone solvent selected from the group consisting of methyl isobutyl ketone, diisobutyl ketone, and acetophenone,
and
wherein, as a second solvent, the solvent includes n-decane.

2. The slurry according to claim 1, wherein the proportion of the PVDF binder to the total solid content of the slurry is 10% by weight or less.

3. The slurry according to claim 1, wherein the proportion of the PVDF binder to the total solid content of the slurry is 5% by weight or less.

4. The slurry according to claim 1, wherein the proportion of the PVDF binder to the total solid content of the slurry is 3% by weight or less.

5. The slurry according to claim 1, wherein the proportion of the PVDF binder to the total solid content of the slurry is 2% by weight or less.

6. A method for producing an all-solid-state battery, the method comprising a step of forming an electrolyte-containing layer by using a slurry including a sulfide solid electrolyte containing $LiI$—$Li_2O$—$Li_2S$—$P_2S_5$, a PVDF binder, and a solvent, and as a first solvent, the solvent includes 50 volume % or more of a ketone solvent selected from the group consisting of methyl isobutyl ketone, diisobutyl ketone, and acetophenone,
and
wherein, as a second solvent, the solvent includes n-decane.

7. The method for producing an all-solid-state battery according to claim 1, wherein the solvent includes 10 volume % or more of the second solvent.

8. The method for producing an all-solid-state battery according to claim 6, wherein the electrolyte-containing layer is a solid electrolyte layer.

9. The method for producing an all-solid-state battery according to claim 6, wherein the slurry further includes a cathode active material, and the electrolyte-containing layer is a cathode active material layer.

10. The method for producing an all-solid-state battery according to claim 6, wherein the slurry further includes an anode active material, and the electrolyte-containing layer is an anode active material layer.

11. An all-solid-state battery comprising a cathode active material layer, an anode active material layer, and a solid electrolyte layer formed between the cathode active material layer and the anode active material layer, and at least one of the cathode active material layer, the anode active material layer, and the solid electrolyte layer includes a sulfide solid electrolyte containing LiI—$Li_2O$—$Li_2S$—$P_2S_5$, a PVDF binder, and a residual solvent, and the residual solvent includes a ketone solvent selected from the group consisting of methyl isobutyl ketone, di isobutyl ketone, and acetophenone as a first solvent, and includes n-decane as a second solvent.

* * * * *